Aug. 9, 1932.    F. H. MILLER    1,870,821
SUSPENSION CLAMP
Filed Nov. 2, 1927

INVENTOR
Frederic H. Miller
BY
Wesley G. Carr
ATTORNEY

Patented Aug. 9, 1932

1,870,821

UNITED STATES PATENT OFFICE

FREDERIC H. MILLER, OF WILKINSBURG, PENNSYLVANIA, ASSIGNOR TO WESTINGHOUSE ELECTRIC & MANUFACTURING COMPANY, A CORPORATION OF PENNSYLVANIA

SUSPENSION CLAMP

Application filed November 2, 1927. Serial No. 230,470.

My invention relates to conductor clamps and particularly to suspension clamps for use in connection with high-voltage transmission lines.

One object of my invention is to provide a clamp structure of the above-indicated character that shall be a self-contained unit including only one member that must be manipulated to mount and dismount a conductor relative thereto.

Another object of my invention is to provide a suspension clamp that shall greatly facilitate the operations of mounting and dismounting a conductor relative thereto in the field during installation or repair operations.

Another object of my invention is to provide a suspension clamp that shall be simple and durable in construction, economical to manufacture and effective in its operation.

While my invention, in certain of its aspects, may apply to a clamp of any usual and well known form, it is herein illustrated as incorporated to particular advantage in a clamp which normally holds the conductor securely, but that, upon the occurrence of breakage of the conductor or other abnormal line conditions which cause the clamp parts to take certain relative positions, releases the conductor to release the strain on the clamp, on the conductor and on associated insulator and tower parts.

Clamps of this general character have been suggested heretofore, but in any of them of which I am aware, there are several parts such as nuts, bolts and clamp members which, if assembled at the factory, must be disassembled and re-assembled in the field to mount the conductor in operative relation thereto.

It is my aim to overcome this objection, and accordingly, in practicing my invention, I provide a clamp in which all of the parts are so constructed and related as to render disassembly and re-assembly thereof in the field unnecessary, and to permit the clamp at all times to be a unitary or self-contained structure.

Figure 1:
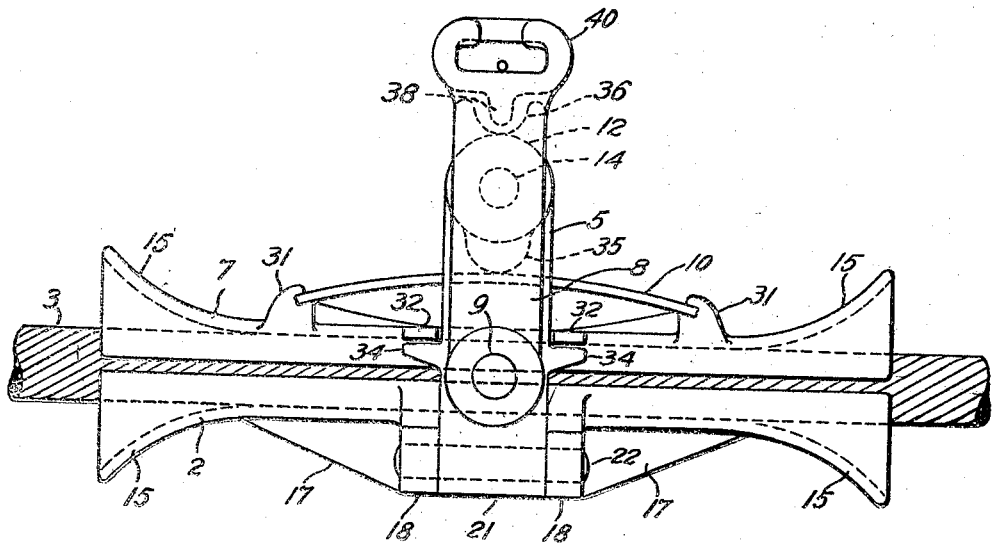
Figure 3:
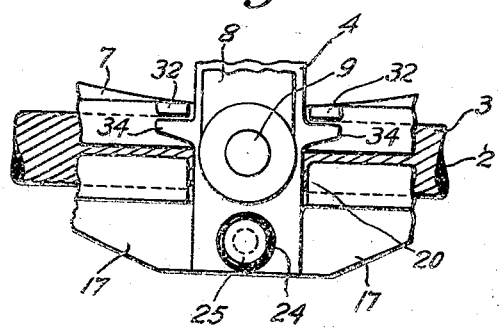
Figure 2:
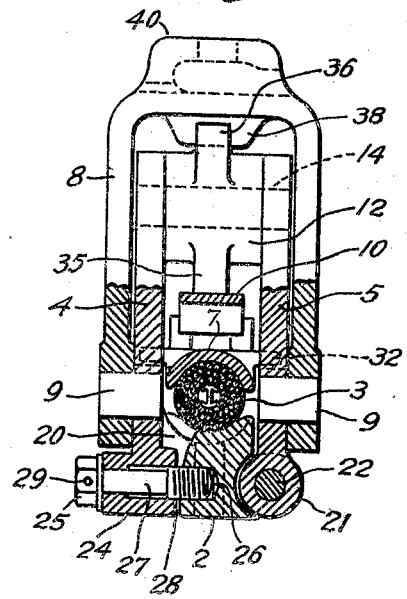

Figure 1 of the accompannying drawing is a side elevational view of a clamp structure embodying my invention, with a portion of a conductor therein, Fig. 2 is a view taken at right angles to Fig. 1, partially in elevation and partially in central section, and, Fig. 3 is a fragmentary view similar to the lower central portion of the device shown in Fig. 1, but as viewed from the reverse side of Fig. 1.

The device comprises, in general, a lower channel or conductor-receiving member 2, for supporting a conductor 3, members 4 and 5 at opposite sides of the conductor, an upper clamping shoe or member 7, a yoke member 8 that is connected to the side members 4 and 5 by trunnions 9, a spring member 10 that is mounted on the shoe member 7 and a cam member 12 that is disposed between the side members 4 and 5 and mounted pivotally relative thereto, as by a pin or shaft 14.

The channel member 2 and the shoe member 7 are similar in that they are each of substantially half-tubular formation, extending along the conductor 3, across the longitudinal central axis of the yoke member 8, and have flared ends 15 for preventing fatigue stresses in the conductor adjacent to these ends.

The trunnions 9 are disposed in alignment with each other on opposite sides of the conductor 3, along an axis extending substantially through the longitudinal axis of the conductor 3.

The channel member 2 is also provided with lower reinforcing web portions 17, bosses 18 at one side adjacent to the center thereof, and a recessed portion 20 at the opposite side and at the center thereof for a purpose to be hereinafter more fully pointed out.

The lower end of the side member 5 is provided with an apertured hinge portion 21 for the reception of a pin 22 that extends therethrough and into the lugs 18 whereby the channel member 2 may swing about an axis parallel to the longitudinal axis of the conductor 3.

The lower end of the side member 4 is provided with a boss 24 for the reception of a screw 25 which extends into a recess 26 in the channel member 2 for holding the latter in position and releasing the same by manipulation of the screw 25 only.

The screw 25 may be of an ordinary type whereby it may be partially or entirely withdrawn from the boss 24, or, as shown, may be provided with portions 27 and 28 of different diameter, upon the portion 27 of which the head of the screw may be held, as by a pin 29, to prevent the ready entire withdrawal of the screw 25 from its position on the clamp.

The shoe 7 is provided with lugs 31, by which the spring 10 is held in position, and with laterally extending side lugs 32 that loosely embrace the side members 4 and 5 for preventing longitudinal withdrawal of the shoe 7 along the conductor 3.

The side members 4 and 5 are provided with lugs 34 which cooperate with the lugs 32 to limit the downward movement of the shoe 7 when the conductor 3 is not in the clamp.

The cam member 12 is provided with a lower cam portion 35 for engagement with the spring 10 and upper diverging projections or lugs 36 disposed on opposite sides of a lug 38 on the yoke 8. The latter is also provided with a socket portion 40, or other suitable means, for attachment to the pin of the lower unit of a series string of insulator units of well-known form.

In initially assembling the clamp, the pin or shaft 14, the trunnions 9 and the pin 22 are permanently fixed in position in any suitable manner.

In operation, when the bolt 25 is withdrawn a sufficient distance, the channel member 2 may pivot about the axis of the pin 22, to permit the withdrawal of the conductor 3 from the clamp, the recess 20 permitting the member 2 to clear the boss 24. When this occurs, the shoe member 7 drops to a position in which the lugs 32 engage the lugs 34, and thereby ordinarily remains in the clamp as a part of its structure.

With the parts thus disposed, when it is desired to place the conductor in the clamp, the yoke member 8 and the cam member 12 are moved about the axis of the trunnions 9 and the pin 14, respectively, so that they lie at an angle to the shoe 7 and the channel member 2. The conductor 3 is then inserted in position between the members 2 and 7, the channel member 2 moved, about the axis of the pin 22, to its closed position, and the screw 25 advanced to the position illustrated, in which the parts are again assembled about the conductor.

After the above operation, by moving the yoke member 8 back to its position, illustrated in Fig. 1, the cam member 12 is also moved, by engagement of the lug 38 with one of the projections 36, to the position shown, in which the cam portion 35 depresses the spring 10 to securely clamp the shoe member 7 against the conductor.

Under normal operating conditions, ordinary oscillations of the conductor 3 are compensated for by a slight lost motion between the lugs 36 and 38. When, by reason of the breakage of the conductor or other abnormal condition, the clamp and its associated suspension insulator swing about the upper end of the insulator a predetermined distance, such as 30° from the normal vertical position of the yoke 8, the yoke moves at an angle to the clamping members 2 and 7, and the lug 38 engages one of the lugs 36 to release the cam portion 35 from the spring 10. This action releases the shoe 7 and permits the conductor 3 to slip through the clamp.

After the initial movement of the parts, caused by the breakage of the conductor, and when the strain at one side of the clamp is sufficiently relieved, the parts tend to return to their normal positions whereby, if a sufficient portion of the conductor remains at the one side of the camp, the conductor will be snubbed and prevented from entirely withdrawing from the clamp.

When the conductor has been repaired, the clamp may be caused to again grip the same by merely moving the yoke 8 to its normal position with respect to the members 2 and 7, as above pointed out.

Various other clamping means aside from those shown, may be employed within the purview of my invention which contemplates, as claimed, the self-contained or unitary features of the invention, in combination with the particular clamping elements and equivalent features, whereby a compact structure is obtained, and whereby it is only necessary to manipulate one member to mount and dismount the conductors relative to the clamp, and other features of advantage are obtained.

While I have shown and described a particular form of my invention, changes may be effected therein without departing from the spirit and scope thereof, as set forth in the appended claims.

I claim as my invention:

1. In a cable-suspension clamp, a suspension-yoke structure embodying an upper mounting portion and depending legs, elements pivotally connected to said legs for movement relative thereto about an axis transverse to the position of the cable axis in the clamp, a clamping member mounted on, and between, said elements for pivotal movement therewith and movement relative thereto, a co-operating clamping member mounted on one of said elements for pivotal movement therewith about the axis thereof and pivotal movement relative thereto about an axis substantially parallel to said position, means for securing said co-operating clamping member to the other element, and means for actuating said members to clamping position.

2. In a cable-suspension clamp, a suspension-yoke structure embodying an upper mounting portion and depending legs, elements pivotally connected to said legs for movement relative thereto about an axis transverse to the position of the cable axis in the clamp, a clamping member mounted on, and between, said elements for pivotal movement therewith and movement relative thereto, a co-operating clamping member mounted on one of said elements for pivotal movement therewith about the axis thereof and pivotal movement relative thereto about an axis substantially parallel to said position, means for securing said co-operating clamping member to the other element, and means for actuating said members to clamping position, co-operating with the yoke to release the cable in response to predetermined movement between the yoke and the clamping members.

3. In combination, a cable-receiving channel member, a suspension structure including an upper mounting portion and a pair of upright side elements carried by, and below, said mounting portion, means connecting the channel member to said structure and providing relative movement between the channel member and said mounting portion about an axis transverse to the channel, means providing relative movement between the channel member and one of said upright elements about an axis substantially parallel to the channel adjacent to one side of the channel, and means releasably securing the other side of the channel member to the other upright element.

4. In combination, a suspension yoke of inverted substantially U-shape, a pair of upright members inside the legs of the yoke pivotally secured thereto, a cable-receiving channel member pivotally secured to one of said upright members, means for releasably securing the channel member to the other upright member, an upper cable-clamping member between said upright members having limited sliding movement relative thereto, a spring above the upper clamping member, and a cam pivotally connected between the upright members and co-operating between the spring and the closed end of the yoke to normally clamp the cable and to release it in response to predetermined movement between the channel member and the yoke.

5. In a cable support, a suspension yoke embodying an upper mounting portion and depending legs, elements pivotally carried by said legs for movement relative thereto about an axis transverse to the position of the cable axis in the support, a cable-receiving member mounted on one of said elements for pivotal movement therewith about the axis thereof and pivotal movement relative thereto about an axis substantially parallel to said position, means releasably securing the cable-receiving member to the other of said elements, and means for holding the cable in position relative to the cable-receiving member.

6. In combination, in a cable support constituting substantially a closed loop surrounding the position of the cable axis therein and comprising, as perimetral sections of the loop, a top-end mounting portion, a pair of upright side portions and a bottom-end cable-receiving portion between the lower ends of said side portions, the structure, viewed at right angles to said position, being of inverted substantially T-shape, with said receiving portion constituting the head and the other sections together constituting the leg, means pivotally mounting the head to tilt in opposite directions from its central position on the leg, a hinge connecting adjacent ends of two of said sections to provide movement of one of the hinged sections outwardly from the perimeter of the loop about an axis parallel to the loop axis, and means releasably securing said one section in position in the loop.

In testimony whereof, I have hereunto subscribed my name this 24th day of October 1927.

FREDERIC H. MILLER.